J. WIRTH.
CEMENT BAG CLEANER.
APPLICATION FILED MAR. 11, 1921.

1,384,795.

Patented July 19, 1921.

Inventor
Joseph Wirth
By Shepherd & Campbell
Attorney

UNITED STATES PATENT OFFICE.

JOSEPH WIRTH, OF FOND DU LAC, WISCONSIN.

CEMENT-BAG CLEANER.

1,384,795. Specification of Letters Patent. Patented July 19, 1921.

Application filed March 11, 1921. Serial No. 451,625.

*To all whom it may concern:*

Be it known that I, JOSEPH WIRTH, a citizen of the United States, residing at 130 West Division street, Fond du Lac, in the county of Fond du Lac and State of Wisconsin, have invented certain new and useful Improvements in Cement-Bag Cleaners, of which the following is a specification, reference being had therein to the accompanying drawings.

This invention relates to a bag cleaning apparatus particularly adapted to remove cement from cement sacks and to salvage the cement removed.

To encourage the return of the sacks, dealers in cement add to the charge of each sack of cement a sum sufficient to cover the cost of the sack and refund that sum to the purchaser when the sack is returned. Thus, large numbers of sacks are returned to the dealers and most of these sacks have a considerable quantity of cement left in them.

It is desirable to remove this cement, for several reasons, among which may be mentioned the fact that if the sacks get wet or are subjected to a prolonged period of extremely damp weather during shipment back to the plant to be filled, they become exceedingly hard and stiff if any considerable quantity of cement remains in them. Furthermore it is much more convenient to handle and pack the sacks for shipment after they have been thoroughly cleaned of the cement and in addition, the value of the cement salvaged is considerable.

It is the object of the present invention to provide an apparatus which will quickly and economically clean the sacks of the cement, as above set forth, but which apparatus will be susceptible of very economical construction and may be operated by unskilled labor.

Further objects and advantages of the invention will be set forth in the detailed description which follows.

Figure 1:
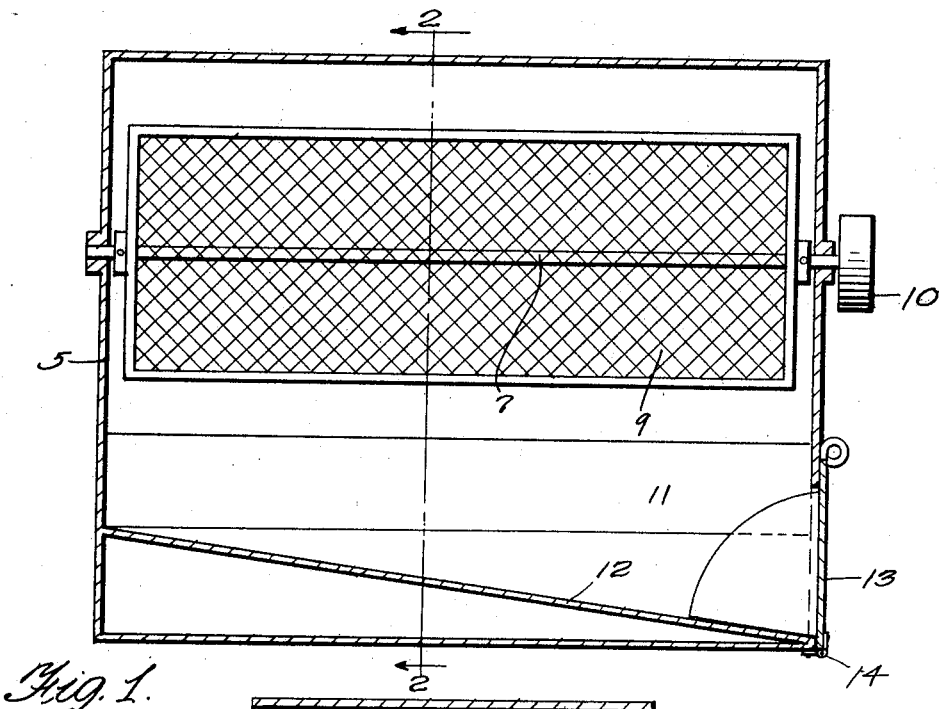
Figure 2:
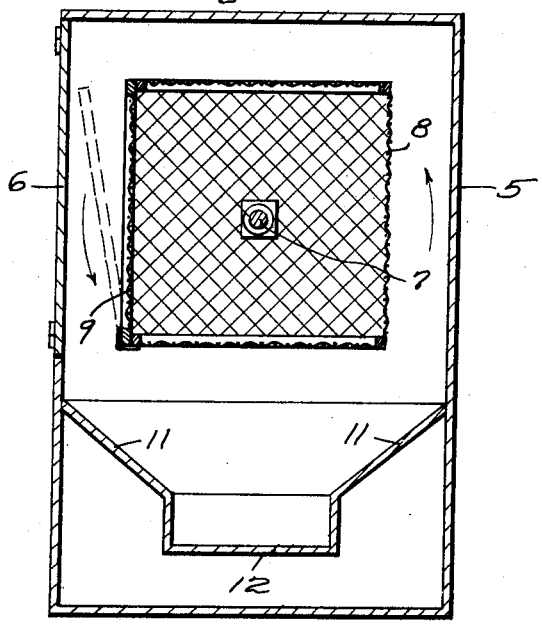

In the accompanying drawing:

Figure 1 is a longitudinal sectional view of a cement bag cleaning apparatus constructed in accordance with the invention; and Fig. 2 is a transverse vertical sectional view thereof upon line 2—2 of Fig. 1.

Like numerals designate corresponding parts in both of the figures of the drawing.

Referring to the drawing 5 designates a box like casing having a door 6 in its front side through which access may be had to the interior of the casing. A shaft 7 is journaled for rotation in the end walls of the casing and carries a screen receptacle 8, one side of which is provided with a door 9. When the door 9 is brought opposite the door 6, the screen receptacle 8 may be filled with the cement sacks that are to be cleaned. The shaft 7 carries a pulley 10 by means of which rotation may be imparted to the shaft and to the screen receptacle with the result that the sacks will not only be agitated to shake the cement loose from the sacks but, in addition a centrifugal action will be set up tending to separate the cement from the sacks. A hopper comprising flaring walls 11 which extend from side to side of the casing 5 is provided with an inclined bottom 12 by which the cement selected is directed to the lower end of the bottom 12, adjacent a clean-out door 13 which is hingedly connected to the casing 5 at 14 and through which door the cement may be removed after it has collected in sufficient quantities.

It is to be understood that the invention is not limited to the precise construction set forth but that it includes within its purview whatever changes fairly come within either the terms or the spirit of the appended claim.

Having described my invention, what I claim is:

A cement bag cleaning apparatus comprising a box like casing having a door in the front side thereof, a receptacle square in cross section all of the sides of which are formed of screen material and one of said sides being hingedly connected to said receptacle to swing outwardly and downwardly through the front of the box like casing, when the door of said casing is open, to thereby permit of the charging of cement bags to be cleaned into said receptacle through the front wall of the casing and across said hinged side, means for rotating the receptacle within the casing and a door in the casing near the bottom thereof to permit of the removal of the cement dislodged from bags placed in the receptacle.

In testimony whereof I hereunto affix my signature.

JOSEPH WIRTH.